US012694069B2

(12) United States Patent
Jain et al.

(10) Patent No.: US 12,694,069 B2
(45) Date of Patent: Jul. 28, 2026

(54) SPARSE MATRIX DENSE VECTOR MULTIPLICATION CIRCUITRY

(71) Applicant: Xilinx, Inc., San Jose, CA (US)

(72) Inventors: Abhishek Kumar Jain, San Jose, CA (US); Dinesh Gaitonde, Fremont, CA (US)

(73) Assignee: XILINX, INC., San Jose, CA (US)

( * ) Notice: Subject to any disclaimer, the term of this patent is extended or adjusted under 35 U.S.C. 154(b) by 1192 days.

(21) Appl. No.: 17/679,887

(22) Filed: Feb. 24, 2022

(65) Prior Publication Data

US 2023/0267169 A1 Aug. 24, 2023

(51) Int. Cl.
*G06F 17/16* (2006.01)
(52) U.S. Cl.
CPC ................................... *G06F 17/16* (2013.01)
(58) Field of Classification Search
CPC ....................................................... G06F 17/16
See application file for complete search history.

(56) References Cited

U.S. PATENT DOCUMENTS

| 10,572,409 | B1 | 2/2020 | Zejda et al. | |
| 10,977,018 | B1 | 4/2021 | Hwang et al. | |
| 2022/0382829 | A1* | 12/2022 | Pope | G06F 7/78 |

OTHER PUBLICATIONS

D. Zou et al. "High Performance Sparse Matrix-Vector Multiplication on FPGA," IEICE electronics express, vol. 10, No. 17 (Year: 2013).*

Sparse Matrix, Wikipedia entry, pp. 1-9, Nov. 11, 2021. (Year: 2021).*

Tuple, Wikipedia entry, pp. 1-8, Nov. 18, 2021. (Year: 2021).*

Norman P. Jouppi, et al., "A Domain-Specific Architecture for Deep Neural Networks", Communications of the ACM, Sep. 2018, vol. 61, No. 9.

Shinjin Zhang, et al., "Cambricon-X: An Accelerator for Sparse Neural Networks", 2016 49th Annual IEEE/ACM International Symposium on Microarchitecture (MICRO), 2016, pp. 1-12, doi: 10.1109/MICRO.2016.7783723.

Eric Qin, et al. "STIGMA: A Sparse and Irregular GEMM Accelerator with Flexible Interconnects for DNN Training", 2020 IEEE International Symposium on High Performance Computer Architecture (HPCA), 2020, pp. 58-70.

(Continued)

*Primary Examiner* — Andrew Caldwell
(74) *Attorney, Agent, or Firm* — Patterson + Sheridan, LLP

(57) ABSTRACT

Circuitry for multiplying a sparse matrix by a dense vector includes a first switching circuit (302) for routing input triplets from N input ports to N output ports based on column indices of the triplets. Each triplet includes a non-zero value, a row index, and a column index. N first memory banks (303) store subsets of vector elements and are addressed by the column indices of the triplets. N multipliers (305) multiply the non-zero values of the triplets by the vector element read from the respective memory bank. A second switching circuit (304) routes tuples based on row indices of the tuples. Each tuple includes a product output by the one of the N multipliers and a row index output by an output port of the first switching circuit. N accumulator circuits (307) sum products of tuples having equal row indices.

16 Claims, 8 Drawing Sheets

(56)          References Cited

OTHER PUBLICATIONS

Mathew Hall, et al., "From TensorFlow Graphs to LUTs and Wires: Automated Sparse and Physically Aware CNN Hardware Generation", 2020 International Conference on Field-Programmable Technology (ICFPT), 2020, pp. 56-65, doi: 10.1109/ICFPT51103.2020.00017.

Shijie Cao, et al., "Efficient and Effective Sparse LSTM on FPGE with Bank-Balanced Sparsity", Copyright 2019, FPGA '19, Feb. 24-26, 2019, Seaside, CA, USA.

Jeremy Fowers, et al., "A High Memory Bandwidth FPGA Accelerator for Sparse Matrix-Vector Multiplication", 2014 IEEE 22nd Annual International Symposium on Field-Programmable Custom Computing Machines, 2014, pp. 36-43, doi: 10.1109/FCCM.2014.23.

Abhishek Kumar Jain, et al., "A Domain-Specific Architecture for Accelerating Sparse Matrix Vector Multiplication on FPGAs", 2020 30th International Conference on Field-Programmable Logic and Applications (FPL), 2020, pp. 127-132, doi: 10.1109/FPL50879.2020.00031.

Jeremy Kepner, et al., "Sparse Deep Neural Network Graph Challenge", 2019 IEEE High Performance Extreme Computing Conference (HPEC), 2019, pp. 1-7, doi: 10.1109/HPEC.2019.8916336.

Xilinx, "7 Series FPGAs Data Sheet: Overview", www.xilinx.com, DS180 (v2.6.1), Sep. 8, 2020.

Tayo Oguntebi, et al., "GraphOps: A Dataflow Library for Graph Analytics Acceleration", FPGA'16, Feb. 21-23, 2016, Monterey, CA, USA, 2016 Copyright.

George Michelogiannakis, "Elastic-Buffer Flow Control for On-Chip Networks", in IEEE Transactions on Computers, vol. 62, No. 2, pp. 295-309, Feb. 2013, doi: 10.1109/TC.2011.237.

I. Seitanidis, et al., "ElastiStore: An Elastic Buffer Architecture for Network-on-Chip Routers", 2014 Design, Automation & Test in Europe Conference & Exhibition (DATE), 2014, pp. 1-6, doi: 10.7873/DATE.2014.253.

S. Huang, et al., "Accelerating Sparse Deep Neural Networks on FPGAs," 2019 IEEE High Performance Extreme Computing Conference (HPEC), Waltham, MA, USA, 2019, pp. 1-7, doi: 10.1109/HPEC.2019.8916419.

C. Jiang, D. Ojika, B. Patel and H. Lam, "Optimized FPGA-based Deep Learning Accelerator for Sparse CNN using High Bandwidth Memory," 2021 IEEE 29th Annual International Symposium on Field-Programmable Custom Computing Machines (FCCM), Orlando, FL, USA, 2021, pp. 157-164, doi: 10.1109/FCCM51124.2021.00026.

* cited by examiner $$A = \begin{bmatrix} a00 & 0 & 0 & 0 & 0 & a05 & a06 & a07 \\ 0 & a11 & 0 & 0 & 0 & 0 & 0 & 0 \\ 0 & 0 & a22 & 0 & 0 & 0 & 0 & 0 \\ 0 & 0 & 0 & a33 & a34 & 0 & 0 & 0 \\ 0 & 0 & 0 & 0 & a44 & 0 & 0 & 0 \\ 0 & 0 & 0 & 0 & a54 & a55 & 0 & 0 \\ 0 & 0 & 0 & 0 & 0 & 0 & a66 & 0 \\ 0 & 0 & a72 & 0 & 0 & 0 & 0 & a77 \end{bmatrix}$$

$$X = \begin{bmatrix} x0 \\ x1 \\ x2 \\ x3 \\ x4 \\ x5 \\ x6 \\ x7 \end{bmatrix}$$

$$Y = \begin{bmatrix} a00{*}x0 + a05{*}x5 + a06{*}x6 + a07{*}x7 \\ a11 * x1 \\ a22 * x2 \\ a33{*}x3 + a34{*}x4 \\ a44 * x4 \\ a54{*}x4 + a55{*}x5 \\ a66 * x6 \\ a72{*}x2 + a77{*}x7 \end{bmatrix}$$

FIG. 3

| data | a00 | a05 | a06 | a07 | a11 | a22 | a33 | a34 | a44 | a54 | a55 | a66 | a72 | a77 |
|------|-----|-----|-----|-----|-----|-----|-----|-----|-----|-----|-----|-----|-----|-----|
| row  | 0   | 0   | 0   | 0   | 1   | 2   | 3   | 3   | 4   | 5   | 5   | 6   | 7   | 7   |
| col  | 0   | 5   | 6   | 7   | 1   | 2   | 3   | 4   | 4   | 4   | 5   | 6   | 2   | 7   |

FIG. 4 triplets:
data, row, column

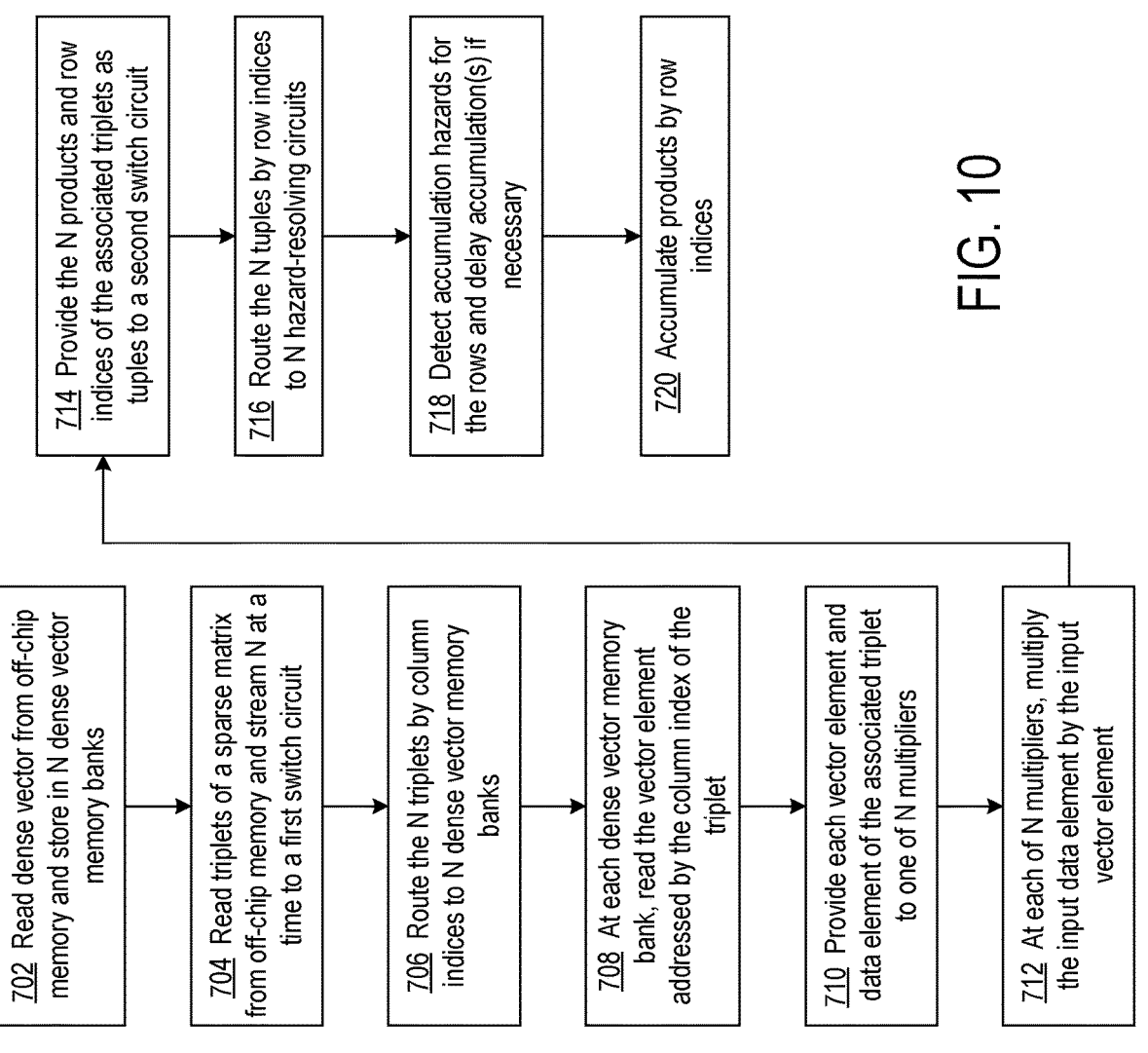

FIG. 10

714 Provide the N products and row indices of the associated triplets as tuples to a second switch circuit 716 Route the N tuples by row indices to N hazard-resolving circuits 718 Detect accumulation hazards for the rows and delay accumulation(s) if necessary 720 Accumulate products by row indices 702 Read dense vector from off-chip memory and store in N dense vector memory banks 704 Read triplets of a sparse matrix from off-chip memory and stream N at a time to a first switch circuit 706 Route the N triplets by column indices to N dense vector memory banks 708 At each dense vector memory bank, read the vector element addressed by the column index of the triplet 710 Provide each vector element and data element of the associated triplet to one of N multipliers 712 At each of N multipliers, multiply the input data element by the input vector element

SPARSE MATRIX DENSE VECTOR MULTIPLICATION CIRCUITRY

TECHNICAL FIELD

The disclosure generally relates to multiplication of a sparse matrix by a dense vector.

BACKGROUND

Matrix multiplication is an integral function in machine learning neural networks. In multi-layer networks, matrix multipliers can be connected in a chain, with output vectors of one matrix multiplier being the input vectors to the next matrix multiplier. Some systems implement parallel matrix multiplier circuitry in an attempt to speed processing. Though parallel matrix multiplier circuitry can improve performance, movement of data between random access memory (RAM) resources and on-chip hardware accelerator memory can limit throughput and involve significant circuit and computing resources.

Matrix multiplication in neural networks often involves sparse matrices. A sparse matrix is a matrix having a large proportion of zero values relative to non-zero values. A common computation is multiplication of a sparse matrix by a dense vector.

Prior approaches aimed at improving performance involve intelligent sparsification of neural network data models. Intelligent sparsification can reduce computation and memory bandwidth requirements without sacrificing too much accuracy. However, sparsity in the data models introduces challenges in designing an efficient system due to irregularity and extra complexity in the execution.

SUMMARY

A disclosed circuit arrangement for multiplying a sparse matrix by a dense vector includes a first switching circuit, N first memory banks, N multipliers, a second switching circuit, and N accumulator circuits. The first switching circuit has N input ports and N output ports and is configured to route input triplets from the N input ports to the N output ports based on column indices of the triplets. Each triplet includes a non-zero value, a row index, and a column index. The N first memory banks are coupled to the output ports of the first switching circuit, respectively. Each first memory bank is configured to store a subset of a plurality of vector elements and has a read-address port coupled to input the column index of the triplet from the respective output port of the first switching circuit. The N multipliers are coupled to read-data ports of the N first memory banks, respectively, and to the N output ports of the first switching circuit, respectively. Each multiplier is configured to multiply the non-zero value of the triplet from the respective output port of the first switching circuit by the vector element from the read-data port of the respective memory bank. The second switching circuit has N input ports coupled to the N output ports of the first switching circuit and to the N multipliers. The second switching circuit is configured to route tuples from the N input ports to N output ports based on row indices of the tuples. Each tuple includes a product output by the one of the N multipliers and a row index output by one of the N output ports of the first switching circuit. The N accumulator circuits are coupled to the N output ports of the second switching circuit, respectively. Each accumulator circuit is configured to sum products of tuples having equal row indices.

A disclosed method for multiplying a sparse matrix by a dense vector includes routing by a first switching circuit having N input ports and N output ports, input triplets from the N input ports to the N output ports based on column indices of the triplets. Each triplet includes a non-zero value, a row index, and a column index. The method includes storing a subset of a plurality of vector elements in N first memory banks that are coupled to the output ports of the first switching circuit, respectively, and each having a read-address port coupled to input the column index of the triplet from the respective output port of the first switching circuit. The method includes multiplying by N multipliers coupled to read-data ports of the N first memory banks, respectively, and to the N output ports of the first switching circuit, respectively, the non-zero value of the triplet from the respective output port of the first switching circuit by the vector element from the read-data port of the respective memory bank. The method includes routing by a second switching circuit having N input ports coupled to the N output ports of the first switching circuit and to the N multipliers, tuples from the N input ports to N output ports based on row indices of the tuples. Each tuple includes a product output by the one of the N multipliers and a row index output by one of the N output ports of the first switching circuit. The method includes summing by N accumulator circuits coupled to the N output ports of the second switching circuit, respectively, products of tuples having equal row indices.

Other features will be recognized from consideration of the Detailed Description and Claims, which follow.

BRIEF DESCRIPTION OF THE DRAWINGS

Various aspects and features of the circuits and methods will become apparent upon review of the following detailed description and upon reference to the drawings in which:

FIG. 3 shows an example of a sparse matrix A, a dense vector X, and a result vector Y that is the result of multiplying the sparse matrix by the dense vector;

FIG. 4 shows triplets that describe the non-zero data elements of the exemplary sparse matrix A of FIG. 3;

FIG. 10 shows a flowchart of an exemplary process for multiplying a sparse matrix by a dense vector.

DETAILED DESCRIPTION

Figure 1:
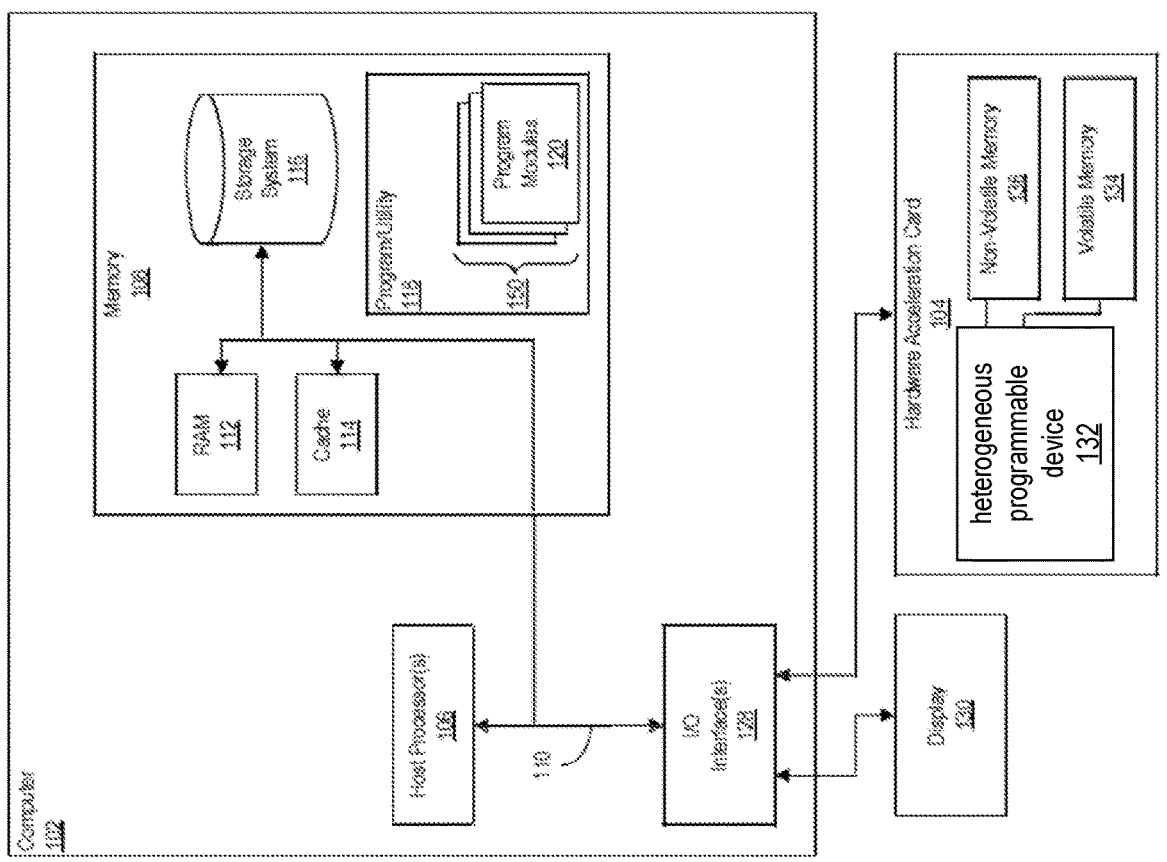
FIG. 1 illustrates an example computing system having a computer (sometimes referred to herein as a "host" or "host system") for use with the inventive arrangements described within this disclosure.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed circuitry can be used in implementing various applications in which sparse matrices are multiplied by dense vectors. The circuitry uses a gather-apply-scatter (GAS) model as an execution strategy and storage of the sparse matrices as a coordinate lists (COO-encoded) in off-chip memory. Multi-ported, on-chip memory banks are used to buffer feature vectors, and routing circuits organize streaming data for multiplication and accumulation.

According to the exemplary circuit arrangements, a switching circuit has N (N≥2) input ports and N output ports. The data elements of the sparse matrix are specified as triplets, each of which includes a non-zero value, a row index, and a column index. The switching circuit is configured to route input triplets from the N input ports to the N output ports based on column indices of the triplets.

The circuit arrangement includes N memory banks coupled to the output ports of the switching circuit, respectively. The memory banks are configured for storage of vector elements of a dense vector, with each of the memory banks storing a subset of the vector elements. The read-address ports of the memory banks are coupled to input the column index of the triplet from the respective output port of the switching circuit.

N multipliers are coupled to the read-data ports of the N memory banks, respectively, and to the N output ports of the first switching circuit, respectively. Each multiplier inputs the vector element read from the associated memory bank and the data element of the triplet at the associated output port of the switching circuit.

Another switching circuit also has N input ports and N output ports. The input ports of the second switching circuit are coupled to the N output ports of the first switching circuit, respectively, and to the N multipliers, respectively. Each input port receives a tuple, which includes a row index from the associated output port of the first switching circuit and a product from the associated multiplier. The second switching circuit routes the tuples from the input ports to the output ports based on the row indices of the tuples.

The circuit arrangement additionally includes N accumulator circuits. Each of the accumulator circuits is coupled to a respective one of the output ports of the second switching circuit, and each accumulator circuit is configured to sum products of tuples having the same row indices.

Figure 2:
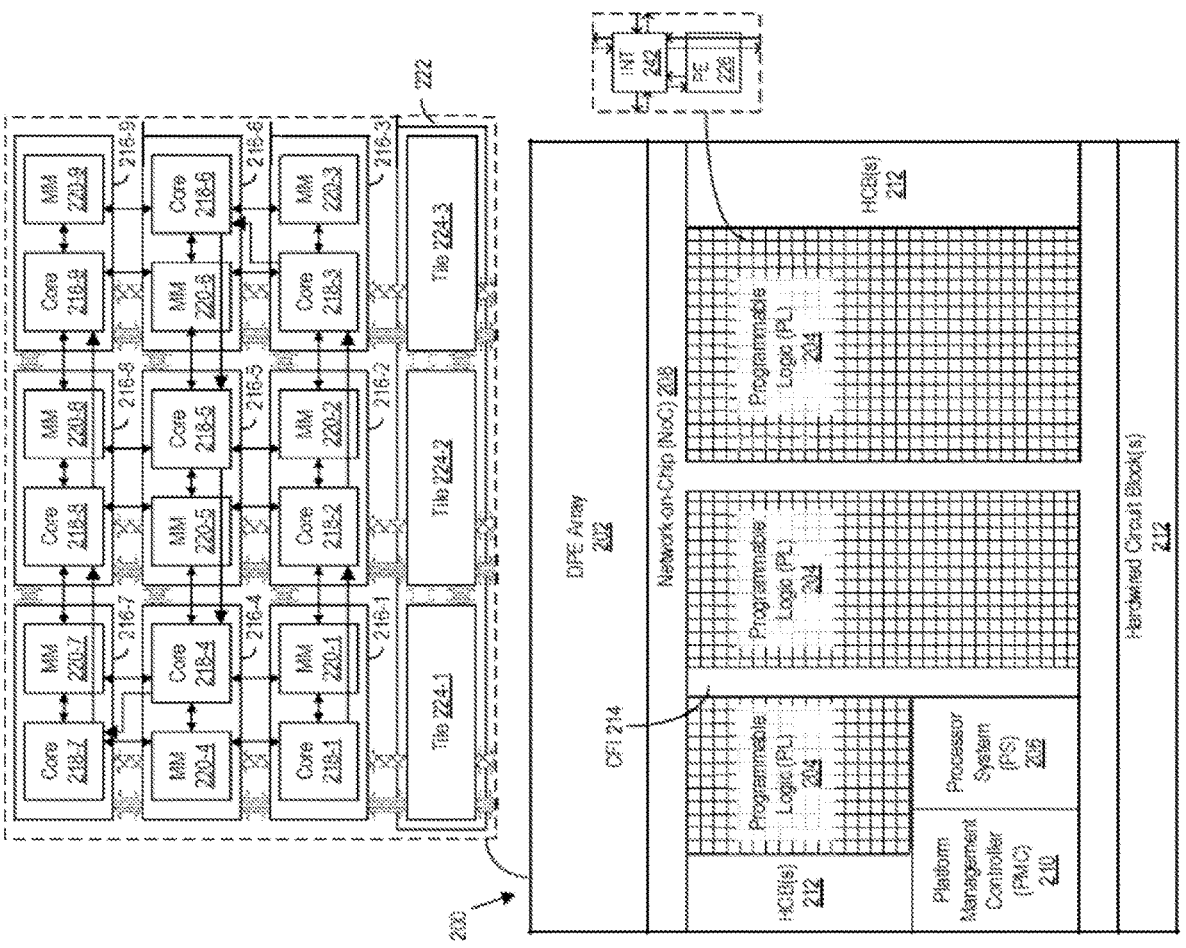
FIG. 2 illustrates an example architecture for heterogeneous device.

The exemplary circuit arrangements can be implemented as part of the exemplary computing system of FIG. 1 and on an exemplary heterogeneous programmable device as shown in FIG. 2

FIG. 1 illustrates an example computing system 100 having a computer 102 (sometimes referred to herein as a "host" or "host system") for use with the inventive arrangements described within this disclosure. Computer 102 may include, but is not limited to, one or more processors 106 (e.g., central processing units), a memory 108, and a bus 110 that couples various system components including memory 108 to processor(s) 106. Processor(s) 106 may include any of a variety of processors that are capable of executing program code. Example processor types include, but are not limited to, processors having an x86 type of architecture (IA-32, IA-64, etc.), Power Architecture, ARM processors, and the like.

Bus 110 represents one or more of any of several types of communication bus structures. Example bus structures include a memory bus, a peripheral bus, a graphics bus, and a processor or local bus. The bus structure may be implemented using any of a variety of available bus architectures. By way of example, and not limitation, such bus architectures include Peripheral Component Interconnect (PCI) bus, PCI Express (PCIe) bus, Advanced Microcontroller Bus Architecture (AMBA) Advanced Extensible Interface (AXI) bus, and/or other known buses.

Computer 102 typically includes a variety of computer readable media. Such media may be any available media that is accessible by computer 102 and may include any combination of volatile media, non-volatile media, removable media, and/or non-removable media.

Memory 108 may include computer readable media in the form of volatile memory, such as random-access memory (RAM) 112 and/or cache memory 114. Computer 102 may also include other removable/non-removable, volatile/non-volatile computer system storage media. By way of example, storage system 116 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each may be connected to bus 110 by one or more data media interfaces. As will be further depicted and described below, memory 108 may include one or more computer program products having a set (e.g., at least one) of program modules (e.g., program code) that are configured to carry out the functions and/or operations described within this disclosure.

For example, program/utility 118, having a set (at least one) of program modules 120 which may include, but are not limited to, an operating system, one or more application programs (e.g., user applications), other program modules, and/or program data, is stored in memory 108. Program modules 120 generally carry out the functions and/or methodologies requiring multiplication of sparse matrices by dense vectors.

Program modules 120 may also implement a software stack. The software stack, when executed by computer 102, may implement a runtime environment capable of communicating with hardware acceleration card 104 at runtime. For example, program modules 120 may include a driver or daemon capable of communicating with heterogeneous device 132. Thus, computer 102 may operate as a host that is capable of executing a runtime software system capable of connecting to hardware acceleration card 104.

In another example implementation, computer 102 is used for purposes of developing, e.g., compiling, the user application. Heterogeneous device 132 may include one or more processors therein providing a complete embedded system. In that case, the one or more processors of heterogeneous device 132 may execute the runtime software system such that the one or more processors embedded in heterogeneous device 132 operate as the host system or host processor as the case may be.

Program/utility 118 is executable by processor(s) 106. Program/utility 118 and any data items used, generated, and/or operated upon by processor(s) 106 are functional data structures that impart functionality when employed by processor(s) 106. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 102 may include one or more Input/Output (I/O) interfaces 128 communicatively linked to bus 110. I/O interface(s) 128 allow computer 102 to communicate with external devices, couple to external devices that allow user(s) to interact with computer 102, couple to external devices that allow computer 102 to communicate with other computing devices, and the like. For example, computer 102 may be communicatively linked to a display 130 and to hardware acceleration card 104 through I/O interface(s) 128. Computer 102 may be coupled to other external devices such as a keyboard (not shown) via I/O interface(s) 128. Examples of I/O interfaces 128 may include, but are not limited to, network cards, modems, network adapters, hardware controllers, etc.

In an example implementation, the I/O interface 128 through which computer 102 communicates with hardware acceleration card 104 is a PCIe adapter. Hardware acceleration card 104 may be implemented as a circuit board that couples to computer 102. Hardware acceleration card 104 may, for example, be inserted into a card slot, e.g., an available bus and/or PCIe slot, of computer 102.

Hardware acceleration card 104 includes heterogeneous device 132. Hardware acceleration card 104 also includes volatile memory 134 coupled to heterogeneous device 132 and a non-volatile memory 136 also coupled to heterogeneous device 132. Volatile memory 134 may be implemented as a RAM that is external to heterogeneous device 132, but is still considered a "local memory" of heterogeneous device 132, whereas memory 108, being within computer 102, is not considered local to heterogeneous device 132. In some implementations, volatile memory 134 may include multiple gigabytes of RAM. Non-volatile memory 136 may be implemented as flash memory. Non-volatile memory 136 is also external to heterogeneous device 132 and may be considered local to heterogeneous device 132.

Notably, volatile memory 134 and non-volatile memory 134 are "off-chip memory" relative to memory resources available on the heterogeneous device 132. That is, heterogeneous device 132 can have RAM banks disposed on the same IC die or package as programmable logic and routing resources of the device, and access to the volatile memory 134 and non-volatile memory 136 is provided to logic on the device way of a memory bus protocol, such as AXI DMA or AXI stream.

FIG. 1 is not intended to suggest any limitation as to the scope of use or functionality of the examples described herein. Computer 102 is an example of computer hardware (e.g., a system) that is capable of performing the various operations described within this disclosure relating to implementing user applications and/or runtime interactions with hardware acceleration card 104 and/or heterogeneous device 132. Heterogeneous device 132, for example, may be implemented as a programmable IC.

Computer 102 is only one example implementation of a computer that may be used with a hardware acceleration card. Computer 102 is shown in the form of a computing device, e.g., a computer or server. Computer 102 can be practiced as a standalone device, as a bare metal server, in a cluster, or in a distributed cloud computing environment. In a distributed cloud computing environment, tasks are performed by remote processing devices that are linked through a communications network. In a distributed cloud computing environment, program modules may be located in both local and remote computer system storage media including memory storage devices.

FIG. 2 illustrates an example architecture 200 for heterogeneous device (FIG. 1, 132). Architecture 200 may be used to implement a programmable IC and an adaptive system. In one aspect, architecture 200 may be implemented as a System-on-Chip (SoC) or System-in-Package (SiP). In one example, architecture 200 can be implemented on a single IC die provided within a single integrated package. In other examples, architecture 200 may be implemented using a plurality of interconnected dies where the various programmable circuit resources and/or subsystems illustrated in FIG. 2 are implemented across the different interconnected dies.

In the example, architecture 200 includes a data processing engine (DPE) array 202, programmable logic (PL) 204, a processor system (PS) 206, a Network-on-Chip (NoC) 208, a platform management controller (PMC) 210, and one or more hardwired circuit blocks (HCBs) 212. A configuration frame interface (CFI) 214 is also included. For purposes of discussion, each of DPE array 202, PL 204, PS 206, NoC 208, PMC 210, and each HCB 212 is an example of a subsystem of architecture 200.

DPE array 202 is implemented as a plurality of interconnected and programmable data processing engines (DPEs) 216. DPEs 216 may be arranged in an array and are hardwired. Each DPE 216 can include one or more cores 218 and a memory module (abbreviated "MM" in FIG. 2) 220. In one aspect, each core 218 is capable of executing program code stored in a core-specific program memory contained within each respective core (not shown). Each core 218 is capable of directly accessing the memory module 220 within the same DPE 216 and the memory module 220 of any other DPE 216 that is adjacent to the core 218 of the DPE 216 in the up, down, left, and right directions. For example, core 218-5 is capable of directly reading and/or writing (e.g., via respective memory interfaces not shown) memory modules 220-5, 220-8, 220-6, and 220-2. Core 218-5 sees each of memory modules 220-5, 220-8, 220-6, and 220-2 as a unified region of memory (e.g., as a part of the local memory accessible to core 218-5). This facilitates data sharing among different DPEs 216 in DPE array 202. In other examples, core 218-5 may be directly connected to memory modules 220 in other DPEs.

DPEs 216 are interconnected by programmable DPE interconnect circuitry. The programmable DPE interconnect circuitry may include one or more different and independent networks. For example, the programmable DPE interconnect circuitry may include a streaming network formed of streaming connections (shaded arrows), a memory mapped network formed of memory mapped connections (cross-hatched arrows).

Loading configuration data into control registers of DPEs 216 by way of the memory mapped connections allows each DPE 216 and the components therein to be controlled independently. DPEs 216 may be enabled/disabled on a per-DPE basis. Each core 218, for example, may be configured to access the memory modules 220 as described or only a subset thereof to achieve isolation of a core 218 or a plurality of cores 218 operating as a cluster. Each streaming connection may be configured to establish logical connections between only selected ones of DPEs 216 to achieve isolation of a DPE 216 or a plurality of DPEs 216 operating as a cluster. Because each core 218 may be loaded with program code specific to that core 218, each DPE 216 is capable of implementing one or more different kernels therein.

Cores 218 may be directly connected with adjacent cores 218 via core-to-core cascade connections. In one aspect, core-to-core cascade connections are unidirectional and direct connections between cores 218 as pictured. In another aspect, core-to-core cascade connections are bidirectional and direct connections between cores 218. In general, core-to-core cascade connections generally allow the results stored in an accumulation register of a source core to be provided directly to an input of a target or load core. Activation of core-to-core cascade interfaces may also be controlled by loading configuration data into control registers of the respective DPEs 216.

SoC interface block 222 operates as an interface that connects DPEs 216 to other resources of architecture 200. In the example of FIG. 2, SoC interface block 222 includes a plurality of interconnected tiles 224 organized in a row. In particular embodiments, different architectures may be used to implement tiles 224 within SoC interface block 222 where each different tile architecture supports communication with different resources of architecture 200. Tiles 224 are connected so that data may be propagated from one tile to another bi-directionally. Each tile 224 is capable of operating as an interface for the column of DPEs 216 directly above.

Tiles 224 are connected to adjacent tiles, to DPEs 216 immediately above, and to circuitry below using the streaming connections and the memory mapped connections as shown. Tiles 224 may also include a debug network that connects to the debug network implemented in DPE array 202. Each tile 224 is capable of receiving data from another source such as PS 206, PL 204, and/or another HCB 212. Tile 224-1, for example, is capable of providing those portions of the data, whether application or configuration, addressed to DPEs 216 in the column above to such DPEs 216 while sending data addressed to DPEs 216 in other columns on to other tiles 224, e.g., 224-2 or 224-3, so that such tiles 224 may route the data addressed to DPEs 216 in their respective columns accordingly.

In one aspect, SoC interface block 222 includes two different types of tiles 224. A first type of tile 224 has an architecture configured to serve as an interface only between DPEs 216 and PL 204. A second type of tile 224 is has an architecture configured to serve as an interface between DPEs 216 and NoC 208 and also between DPEs 216 and PL 204. SoC interface block 222 may include a combination of tiles of the first and second types or tiles of only the second type.

PL 204 is circuitry that can be programmed to perform specified functions. As an example, PL 204 may be implemented as field programmable gate array (FPGA) type of circuitry. PL 204 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of PL 204 is highly configurable unlike hardwired circuitry. Each programmable circuit block of PL 204 typically includes a programmable element 226 (e.g., a functional element) and a programmable interconnect 242. The programmable interconnects 242 provide the highly configurable topology of PL 204. The programmable interconnects 242 may be configured on a per wire basis to provide connectivity among the programmable elements 226 of programmable circuit blocks of PL 204 and is configurable on a per-bit basis (e.g., where each wire conveys a single bit of information) unlike connectivity among DPEs 216, for example.

Examples of programmable circuit blocks of PL 204 include configurable logic blocks having look-up tables and registers. Unlike hardwired circuitry described below and sometimes referred to as hard blocks, these programmable circuit blocks have an undefined function at the time of manufacture. PL 204 may include other types of programmable circuit blocks that also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 204, are numerous and intermingled with the other programmable circuit blocks of PL 204. These circuit blocks may also have an architecture that generally includes a programmable interconnect 242 and a programmable element 226 and, as such, are part of the highly configurable topology of PL 204.

Prior to use, PL 204, e.g., the programmable interconnect and the programmable elements, must be programmed or "configured" by loading data referred to as a configuration bitstream into internal configuration memory cells therein. The configuration memory cells, once loaded with a configuration bitstream, define how PL 204 is configured, e.g., the topology, and operates (e.g., particular functions performed). Within this disclosure, a "configuration bitstream" is not equivalent to program code executable by a processor or computer.

PS 206 is implemented as hardwired circuitry that is fabricated as part of architecture 200. PS 206 may be implemented as, or include, any of a variety of different processor types each capable of executing program code. For example, PS 206 may be implemented as an individual processor, e.g., a single core capable of executing program code. In another example, PS 206 may be implemented as a multi-core processor. In still another example, PS 206 may include one or more cores, modules, co-processors, I/O interfaces, and/or other resources. PS 206 may be implemented using any of a variety of different types of architectures. Example architectures that may be used to implement PS 206 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code. In one aspect, PS 206 may include one or more application processors and one or more real-time processors.

NoC 208 is a programmable interconnecting network for sharing data between endpoint circuits in architecture 200. The endpoint circuits can be disposed in DPE array 202, PL 204, PS 206, and/or selected HCBs 212. NoC 208 can include high-speed data paths with dedicated switching. In an example, NoC 208 includes one or more horizontal paths, one or more vertical paths, or both horizontal and vertical path(s). The arrangement and number of regions shown in FIG. 2 is merely an example. NoC 208 is an example of the common infrastructure that is available within architecture 200 to connect selected components and/or subsystems.

Within NoC 208, the nets that are to be routed through NoC 208 are unknown until a user application is created for implementation within architecture 200. NoC 208 may be programmed by loading configuration data into internal configuration registers that define how elements within NoC 208 such as switches and interfaces are configured and operate to pass data from switch to switch and among the NoC interfaces to connect the endpoint circuits. NoC 208 is fabricated as part of architecture 200 (e.g., is hardwired)

and, while not physically modifiable, may be programmed to establish connectivity between different master circuits and different slave circuits of a user application. NoC 208, upon power-on, does not implement any data paths or routes therein. Once configured, e.g., by PMC 210, however, NoC 208 implements data paths or routes between endpoint circuits.

PMC 210 is responsible for managing architecture 200. PMC 210 is a subsystem within architecture 200 that is capable of managing the programmable circuit resources across the entirety of architecture 200. PMC 210 is capable of maintaining a safe and secure environment, booting architecture 200, and managing architecture 200 during operation. For example, PMC 210 is capable of providing unified and programmable control over power-up, boot/ configuration, security, power management, safety monitoring, debugging, and/or error handling for the different programmable circuit resources of architecture 200 (e.g., DPE array 202, PL 204, PS 206, and NoC 208). PMC 210 operates as a dedicated platform manager that decouples PS 206 and from PL 204. As such, PS 206 and PL 204 may be managed, configured, and/or powered on and/or off independently of one another.

PMC 210 may be implemented as a processor with dedicated resources. PMC 210 may include multiple redundant processors. The processors of PMC 210 are capable of executing firmware. Use of firmware (e.g., executable program code) supports configurability and segmentation of global features of architecture 200 such as reset, clocking, and protection to provide flexibility in creating separate processing domains (which are distinct from "power domains" that may be subsystem-specific). Processing domains may involve a mixture or combination of one or more different programmable circuit resources of architecture 200 (e.g., wherein the processing domains may include different combinations or devices from DPE array 202, PS 206, PL 204, NoC 208, and/or other HCB(s) 212).

HCBs 212 include special-purpose circuit blocks fabricated as part of architecture 200. Though hardwired, HCBs 212 may be configured by loading configuration data into control registers to implement one or more different modes of operation. Examples of HCBs 212 may include input/ output (I/O) blocks, transceivers for sending and receiving signals to circuits and/or systems external to architecture 200, memory controllers, or the like. Examples of different I/O blocks may include single-ended and pseudo differential I/Os. Examples of transceivers may include high-speed differentially clocked transceivers. Other examples of HCBs 212 include, but are not limited to, cryptographic engines, digital-to-analog converters (DACs), analog-to-digital converters (ADCs), and the like. In general, HCBs 212 are application-specific circuit blocks.

CFI 214 is an interface through which configuration data, e.g., a configuration bitstream, may be provided to PL 204 to implement different user-specified circuits and/or circuitry therein. CFI 214 is coupled to and accessible by PMC 210 to provide configuration data to PL 204. In some cases, PMC 210 is capable of first configuring PS 206 such that PS 206, once configured by PMC 210, may provide configuration data to PL 204 via CFI 214. In one aspect, CFI 214 has a built in cyclic redundancy checking (CRC) circuitry (e.g., CRC 32-bit circuitry) incorporated therein. As such, any data that is loaded into CFI 214 and/or read back via CFI 214 may be checked for integrity by checking the values of codes attached to the data.

The various programmable circuit resources illustrated in FIG. 2 can be programmed initially as part of a boot process for architecture 200. During runtime, the programmable circuit resources may be reconfigured. In one aspect, PMC 210 is capable of initially configuring DPE array 202, PL 204, PS 206, and NoC 208. At any point during runtime, PMC 210 may reconfigure all or a portion of architecture 200. In some cases, PS 206 may configure and/or reconfigure PL 204 and/or NoC 208 once initially configured by PMC 210.

In another aspect, a heterogeneous device includes dedicated on-chip circuitry that exposes I/O interfaces (e.g., AXI bus interfaces or other communication bus interfaces) to other portions of the heterogeneous device. For example, referring to the example of FIG. 2, architecture 200 may include dedicated on-chip circuitry that exposes AXI interfaces to DPE array 202, PL 204, NoC 208, DSP blocks in PL 204, HCBs 212, and/or other programmable I/O included in architecture 200.

FIG. 2 is provided as an example of a heterogeneous device. In other examples, particular subsystems such as PS 206 may be omitted. For example, a heterogeneous device may include DPE array 202 in combination with PL 204. In another example, a heterogeneous device may include DPE array 202 in combination with NoC 208 and PL 204. One or more HCB(s) also may be included in the alternative examples described.

FIG. 3 shows an example of a sparse matrix A, a dense vector X, and a result vector Y that is the result of multiplying the sparse matrix by the dense vector. The example is presented to aid in describing the disclosed circuits and methods. The non-zero data elements of the sparse matrix are denoted aJK, where J is the row index and K is the column index of the data element. Each element in the result vector Y is a dot product of one of the rows of A and the vector data elements x0, . . . , x7.

FIG. 4 shows triplets that describe the non-zero data elements of the exemplary sparse matrix A of FIG. 3. Each triplet includes the value of a non-zero data element of A, the row index of that value, and the column index of that value. For example, the data value a00 has a row value of 0 and a column value of 0.

A high-level programming language specification for multiplying the sparse matrix A by the dense vector X, based on the COO representation of A as shown in FIG. 4, can be expressed as:

```
for (i=0; i<NNZs; i++) {
    y[row[i]] += data[i] * x[col[i]];
}
```

Example 1

The code of Example 1 can be unrolled in order to specify an implementation that can input N non-zero values every cycle and process the N values in N parallel pipelines of multiply-and-accumulate circuitry. The unrolled version of the code in Example 1 is shown in Example 2.

```
for (i=0; i<NNZs; i=i+N) {
    y[row[i]] += data[i] * x[col[i]];
    y[row[i+1]] += data[i+1] * x[col[i+1]];
    y[row[i+2]] += data[i+2] * x[col[i+2]];
    y[row[i+3]] += data[i+3] * x[col[i+3]];
    ...
    y[row[i+N-1]] += data[i+N-1] * x[col[i+N-1]];
}
```

Example 2

The parallel pipeline implementation of the unrolled code of Example 2 has the vector elements of X stored across multiple memory banks, allowing parallel reading of multiple vector elements. Multiple non-zero data elements of the sparse matrix A can be input in parallel, and the associated column indices used to read the appropriate vector element. Products can be generated in parallel by multiple multipliers, and the products can be routed by row indices for accumulation in parallel by multiple accumulator circuits.

Figure 5:
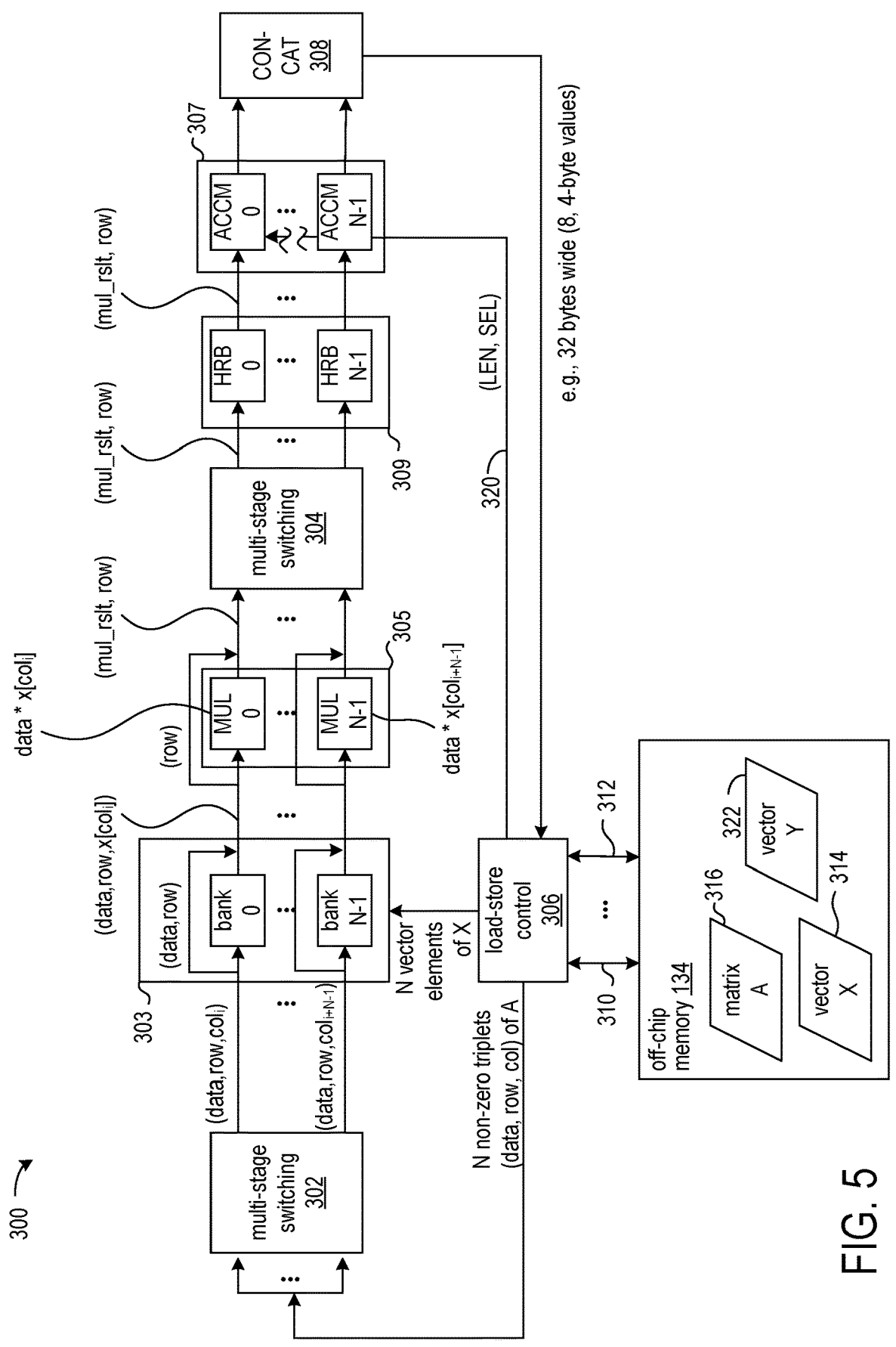
FIG. 5 shows a circuit arrangement configured to multiply a sparse matrix by a dense vector.

FIG. 5 shows a circuit arrangement 300 configured to multiply a sparse matrix by a dense vector. The circuit arrangement generally implements an approach in which vector elements of the dense vector are scattered across multiple memory banks, data elements of the sparse matrix are scattered by column for parallel multiplication with the vector elements, and the products are gathered by row for parallel accumulation. The circuit arrangement 300 generally includes a first switching circuit 302, memory banks 0 through N−1 (303) for storing data elements of the dense vector, N multipliers 305 (MUL 0 through MUL N−1), a second switching network 304, and N accumulator circuits 307 (ACCM 0 through ACCM N−1). The circuit arrangement can also include N hazard-resolving backpressure circuits 309 (HRB 0 through HRB N−1), a load-store control circuit 306, and a concatenation circuit 308.

According to the disclosed circuits and methods, parallel pipelines implemented in a programmable device multiply a sparse matrix by a dense vector, which can be retrieved from high-bandwidth, off-chip memory 134. The off-chip memory can be high bandwidth memory (HBM), which is is characterized by multiple independent, parallel, and wide memory channels communicatively coupled to circuitry of the exemplary programmable IC through suitable memory controllers. The HBM may be implemented using any of a variety of different technologies, including, but not limited to double data rate RAMs.

The load-store control circuit can have multiple wide interfaces 310, 312 to the high-bandwidth memory 134. For example, each of the interfaces to off-chip memory can be 32 bytes wide. The high-bandwidth interfaces can support the parallel multiplication and accumulation performed by the circuit arrangement. For example, a triplet can be 8 bytes wide, with the data value specified in four bytes, the row index specified by two bytes, and the column specified by two bytes. Eight triplets can be read in parallel from the high-bandwidth memory 134 over 2, 32-byte wide channels.

The load-store control circuit 306 initiates multiplication of a sparse matrix by a dense vector by reading the dense vector X 314 from memory 134 and writing subsets of the vector elements to the memory banks 0 though N−1. The vector elements can be stored in the N banks as follows. Vector elements $x_0$ through $x_{N-1}$ can be stored in bank 0 through bank N−1, respectively; elements $x_1$ through $x_N$ can be stored in bank 0 through bank N−1, respectively; elements $x_2$ through $x_{N+1}$ can be stored in bank 0 through bank N−1, respectively; and so on. For example, if dense vector X has 8K (8192) elements and there are 8 banks, elements $x_0$, $x_8$, $x_{16}$, $x_{24}$, . . . $x_{8184}$, can be stored in bank 0; elements $x_1$, $x_9$, $x_{17}$, $x_{25}$, . . . $x_{8185}$, can be stored in bank 1; elements $x_2$, $x_{10}$, $x_{18}$, $x_{26}$, . . . $x_{8186}$, can be stored in bank 2, . . . ; and elements $x_7$, $x_{15}$, $x_{23}$, $x_{31}$, . . . $x_{8191}$, can be stored in bank 7. More generally, for a dense vector having M vector elements indexed 0 through M−1, vector element j is stored in bank number (j modulo N), for $0 \leq j \leq M-1$.

Once the dense vector has been loaded in the memory banks, the load-store control circuit 306 begins streaming the triplets that describe the non-zero elements of the matrix A 316 to the input ports of the switching circuit 302. The load-store control circuit reads N triplets in parallel from the memory 134 over the interfaces 310 and 312 and provides the N triplets to N input ports of the switching circuit, respectively. For example, if the first 8 triplets of FIG. 4 are read in parallel, the triplet {a00,0,0} is provided to input port 0, triplet {a05,0,5} is provided to input port 1, triplet {a06,0,6} is provided to input port 2, triplet {a07,0,7} is provided to input port 3, . . . , and triplet {a34,3,4} is provided to input port 7. The load-store control circuit continues reading triplets and streaming the triplets as input to the switching network until all triplets of the sparse matrix have been read.

As triplets are provided at the input ports, the switching circuit routes the triplets as packets through multiple switch stages according to the column indices of the triplets. The first switching circuit 302 has multiple (e.g., N≥2) input ports and multiple (N) output ports. The triplet input at any input port can have any column index, and the switching circuit routes the triplet to the appropriate one of the output ports. For example, a triplet having column index 0 can be input at input port 4 and would be routed to output port 0. Continuing the example in which 8 banks (bank 0 through bank 7) are provided for storing the dense vector, the switching circuit 302 can route each triplet according to the 3 least significant bits of the 2 bytes that specify the column. A 3-bit value 000 would be routed to bank 0, a 3-bit value 001 would be routed to bank 1, a 3-bit value 010 would be routed to bank 2, . . . , and a 3-bit value 111 would be routed to bank 7. The high order bits of a column index (the bits above the low order bits used for routing) are used as read address input to a memory bank. In the 2-byte example, bits [15:3] are used as the read address (bits [2:0] are used in routing).

Memory banks 0 through N−1 are coupled to the output ports of the switching circuit 302, respectively, with the read-address port of each memory bank being coupled to input the column index of the triplet from the respective output port. The column index input to the read-address port of the memory bank references the proper vector element to read from the memory bank for multiplying with the data element of the triplet. For example, the triplet {a34,3,4} in FIG. 4, would be routed to bank 4, and the column index, 4, addresses the vector element x4.

N multipliers are coupled to the read-data ports of the memory banks 0 through N−1, respectively, and also to the N output ports of the switching circuit 302, respectively. Each multiplier multiplies the vector element of the dense vector read from the coupled memory bank by the non-zero data element of the triplet from the coupled output port of the switching circuit 302.

The output ports of the multiplier circuits are coupled to respective input ports of another switching circuit 304. The input ports of the second switching circuit 304 are also coupled to respective output ports of the first switching circuit 302 to receive the row indices. Each input port of the switching circuit 304 inputs a tuple that includes the product generated by the associated multiplier and the row index from the switching network 302. The row index is from the triplet having the data element used by the multiplier in generating the product. The low-order bits of the row index are used in routing by the switching circuit 304, and the high order bits are used to address the memory bank in the one of the accumulator circuits (ACCM 0 through ACCM N−1) to which the product and row index are routed. For example, in the 2-byte example, bits [2:0] are used in routing, and bits [15:3] are used to address the memory bank.

The circuit arrangement 300 also includes N accumulator circuits 0 through N–12 and N Hazard-Resolving Back Pressure (HRB) circuits 0 through N–1. Each accumulator circuit sums products having the same row index. For example, accumulator circuit 0 would sum products generated from triplets having row index 0, and also, for example, sums of products generated for row indices 8, 16, 24, etc.

As each accumulator circuit generally implements a sequence of reading the current total from memory, adding the input product to the current total, and writing the new current total back to memory, which entails some amount of latency, and products for the same row index could arrive at the accumulator in successive cycles for accumulation, a data hazard can arise. That is, the new current total accumulated from a product input at time t must be written back to memory before the reading of the current total from memory for accumulating the product input at time t+1 (or t+S, where S is the maximum latency).

The HRB circuits are interposed between the switching circuit 304 and the accumulator circuits in order to avoid data hazards. HRB circuits 0 through N–1 are coupled between the N output ports of the switching circuit 304 and input ports of the N accumulator circuits, respectively. Each hazard-resolving circuit delays input to the coupled accumulator circuit, in response to products generated for the same row index being input in successive cycles (or within the maximum latency period), until that accumulator circuit has completed accumulation of the product of the previously input tuple.

Each of the N accumulator circuits is coupled to receive the output product-row tuple from one of the N HRB circuits, and each accumulator circuit accumulates totals of the products by row. The accumulator circuits can have respective memory banks for storing the totals as the totals are accumulated. The current totals in the memory banks can be addressed by the row indices of the tuples. For example, accumulator 0 can have a memory bank that stores totals for rows 0, 8, 16, 24, 32, . . . ; accumulator 1 can have a memory bank that stores totals for rows 1, 9, 17, 25, 33, . . . ; etc.

The data paths between the components of the circuit arrangement 300 are implemented using first-in-first-out (FIFO) buffer circuits. The FIFO buffer circuits can absorb back-pressure introduced by the HRB circuits and introduce delay as needed to compensate for reading from the memory banks 0 through N–1, performing multiplication, and switching. Respective FIFO buffers can be implemented on the data paths between the load-store control circuit 306 and the input ports of the switching circuit 302 for pipelining triplets, between the output ports of the switching circuit 302 and the read-address ports of the memory banks 0 through N–1 for pipelining column indices, between the output ports of the switching circuit 302 and the inputs of the multipliers for pipelining the data element of the triplets, between output ports of the switching circuit 302 and input ports of switching circuit 304 for pipelining row indices, between the switching circuit 304 and the HRB circuits for pipelining tuples, between the HRB circuits and the accumulator circuits for pipelining tuples, and between the accumulator circuits and the concatenation circuit 308 for pipelining result vector elements.

The load-store control circuit 306 controls reading the result vector elements from the memory blocks of the accumulator circuits once multiplication of the sparse matrix and dense vector is complete. The LEN and SEL signals 320 control the accumulator circuits. The SEL signal controls whether the accumulator circuits are writing accumulated totals to the memory banks or the final result vector elements are read from the memory banks, and the LEN signal indicates the number of vector elements to be read from the memory bank in each of the accumulator circuits. The load-store control circuit generates LEN as:

$$LEN=Num\_elts(Y)/N \qquad \text{a.}$$

where Num_elts(Y) is the number of vector elements in the result vector Y, and N is the number of pipelines.

The load-store control circuit 306 reads N result vector elements (the final totals) from the memory banks of the N accumulator circuits in parallel, and the result vector elements are provided on input data paths to the concatenation circuit 308. The concatenation circuit assembles the vector elements in order for communicating to the load-store control circuit. The concatenation circuit forms N-element wide data stream that is input to the load-store circuit, which writes the data to off-chip memory 134. For example, if each result vector element is 4 bytes, concatenation of 8 elements results in a 32 byte wide data stream. The load-store circuit converts the 32 byte wide data stream to off-chip memory transactions in which 32 bytes of data are written in each cycle.

The results vector elements can be written by the load-store control circuit to off-chip memory 134 at the appropriate addresses as vector Y 322.

Figure 6:
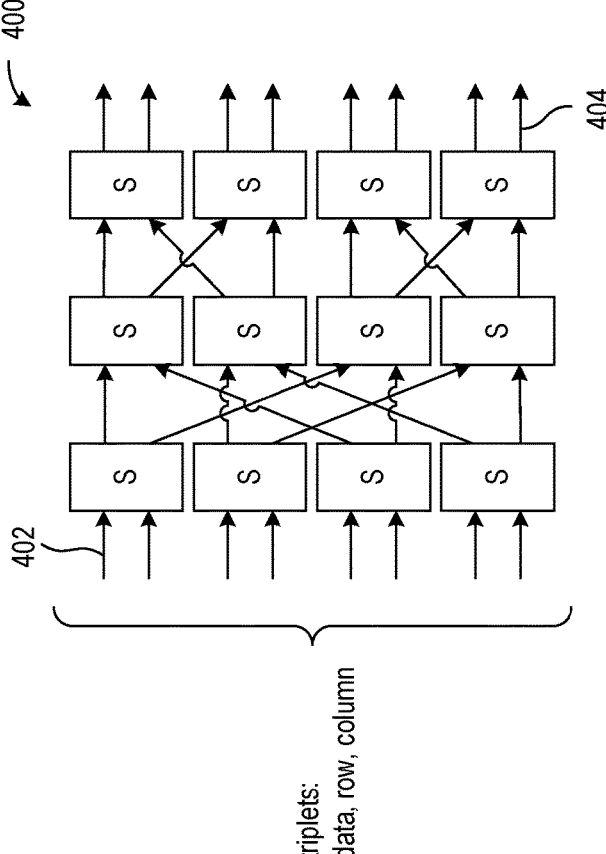
FIG. 6 shows an exemplary switching circuit.

FIG. 6 shows an exemplary switching circuit 400. The switching circuit includes multiple stages of switches. The exemplary switching circuit has three stages and each stage has four switches. Each switch has two input ports and two output ports, thereby supporting input of 8 triplets and output of 8 triplets. Each input triplet is routed according the column index of the triplet. For example, a triplet having column index 7 and input at port 402 can be routed to output port 404.

Figure 7:
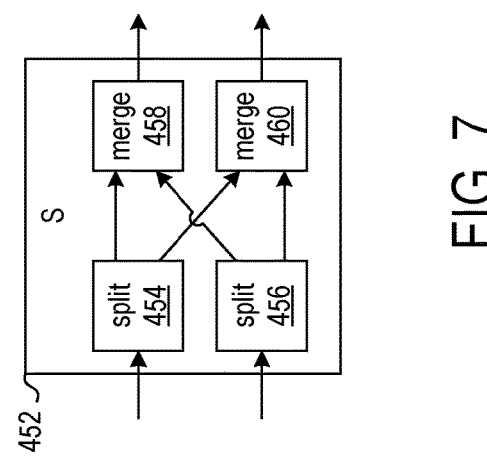
FIG. 7 shows the routing of each switch in the switching circuit of FIG. 6.

FIG. 7 shows the routing of each switch 452 in the switching circuit of FIG. 6. The switch can include two split circuits 454 and 456 and two merge circuits 458 and 460. Each split circuit has an input port for one triplet and two output ports. An input triplet is routed to one of the output ports based on the column index. Each merge circuit has two input ports and one output port. Two input triplets at the input ports of the merge circuit are written to a FIFO buffer circuit for output at the one output port. Handshake signals between the merge circuits and split circuits can be used to control movement of triplets.

Figure 8:
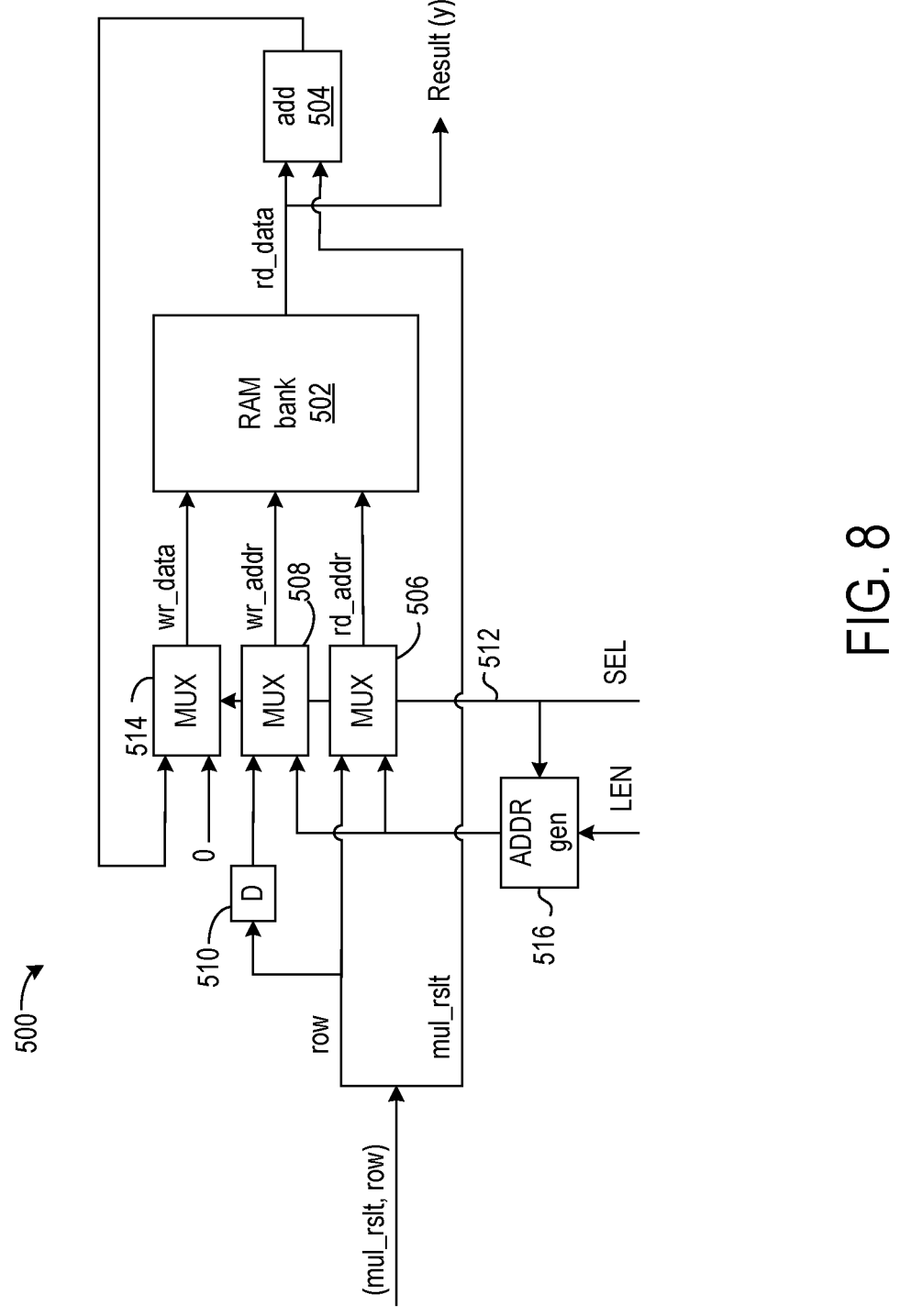
FIG. 8 shows an example of an accumulator circuit.

FIG. 8 shows an example of an accumulator circuit 500. The accumulator circuit is controlled by the load-store control circuit to accumulate products by row index until all of the non-zero values of the input matrix A have been processed and products accumulated. Once multiplication of the sparse matrix and dense vector is complete, the load-store control circuit controls reading the accumulated results from the memory bank 502.

The input to the accumulator circuit is a tuple that includes a product ("mul_rslt") and a row index ("row"). The product is provided as one of the inputs to the adder circuit 504, and the row index is used to indicate a read address to the memory bank 502. The upper bits of the row index (e.g., bits [15:3]) can be used as the address input to the memory bank.

The row index is input to multiplexer 506 and to multiplexer 508 through delay circuit 510. During the accumulation phase, the load-store control circuit can place signal ("SEL") 512 in a state that causes multiplexer 506 to select the row index to use as the read address ("rd_addr") input to the RAM bank. The value read from the RAM bank ("rd_data") and the product are input to the adder circuit 504, and the sum is selected by multiplexer 514 for writing back in the RAM bank ("wr_data") at the write address ("wr_addr"), which is the input row index delayed by delay circuit 510 and selected by multiplexer 508. The input row index is delayed to allow reading of the value from the RAM bank and the adder to sum the input values.

During the read-out phase, once multiplication of the sparse matrix and dense vector is complete, the load-store control circuit can place the SEL signal 512 in a state that causes the address generation circuit 516 to begin generating addresses and the multiplexers 506 and 508 to select the generated address. One result value is read out on each cycle, and the value 0 is selected by multiplexer 514 and written to that address to allow a subsequent sparse matrix-dense vector multiplication. The address generation circuit increments the address input to the multiplexers 506 and 508 for reading from and writing to the RAM bank in the next cycle.

Figure 9:
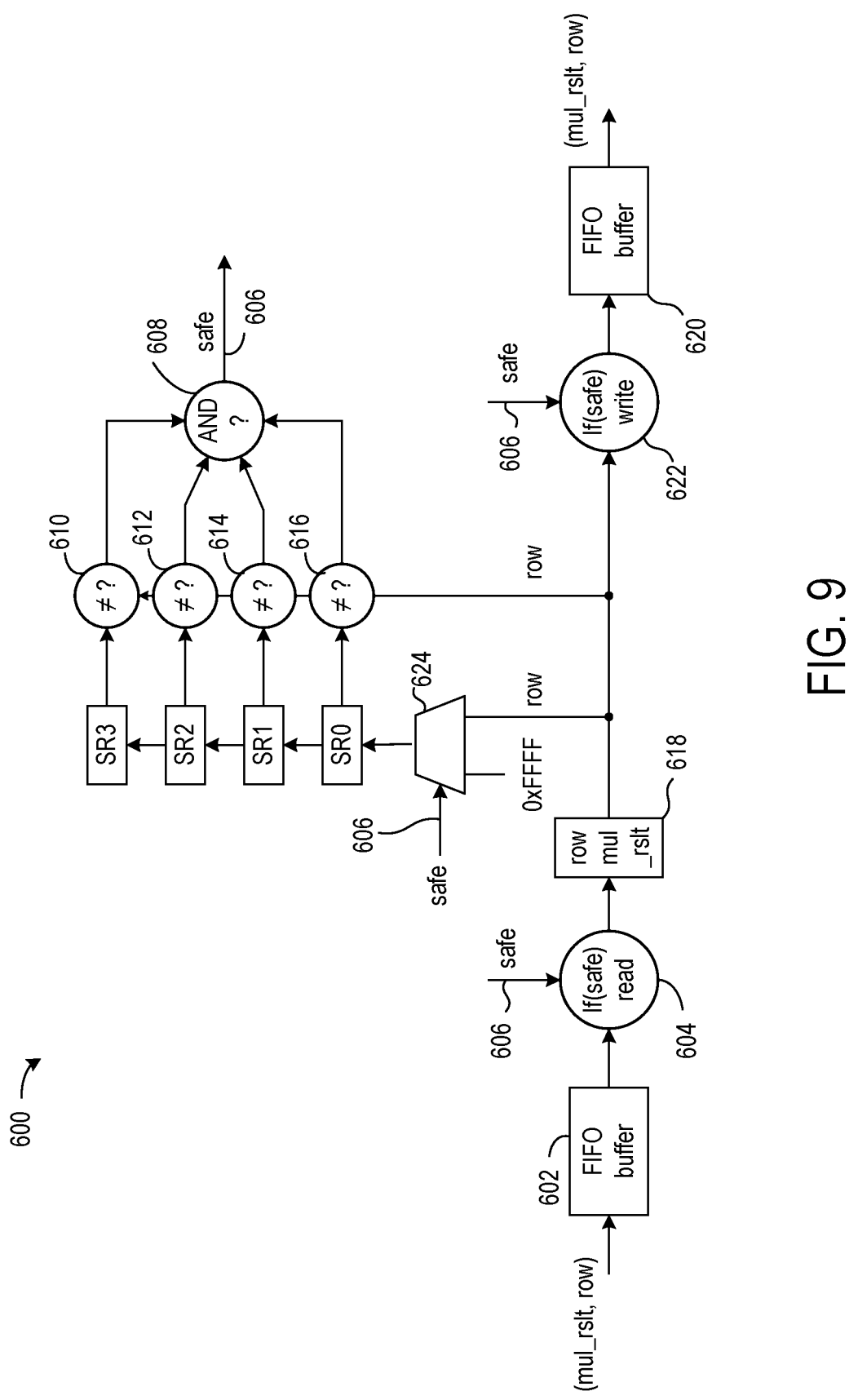
FIG. 9 shows an exemplary hazard-resolving backpressure (HRB) circuit.

FIG. 9 shows an exemplary hazard-resolving backpressure (HRB) circuit 600. The HRB circuit stalls the pipeline in response to an input tuple having the same row index as the row index of a tuple previously input within a latency period. The latency period is the maximum time the accumulator circuit is expected to expend in reading a current total value from the memory bank, adding the current total the product of the input tuple, and writing the new current value back to the memory bank.

The exemplary HRB circuit tracks the row indices of previously input tuples. Up to 4 row indices are tracked by the example, though fewer or more row indices can be tracked depending on implementation requirements. The "in-flight" row indices can be tracked by a shift register having segments SR0, SR1, SR2, and SR3.

Input tuples are buffered in FIFO buffer 602, and logic circuit 604 controls reading of a tuple from the FIFO buffer based on the state of safe signal 606. In response to the safe signal indicating the next tuple can be input, logic circuit 604 reads a tuple from the FIFO buffer and writes the tuple in register 618. The safe signal is generated by AND circuit 608, which inputs signals from comparison circuits 610, 612, 614, and 616. The comparison circuits compare the row indices at SR0, SR1, SR2, and SR3 in the shift register to the row index in the register 618. The output signals from the comparison circuits indicate whether or not the row index in the register 618 is equal to the row index in the respective portion of the shift register. In response to any of the row indices in the shift register being equal to the index in register 618, the safe signal is deasserted to indicate that it is unsafe for logic circuit 622 to allow the tuple in register 618 to be written to the FIFO buffer 620. Otherwise, if the safe signal is asserted, logic circuit 622 writes the tuple from register 618 to the FIFO buffer 620.

Values in the shift register are shifted by one position from SR0 to SR1, from SR1 to SR2, and from SR2 to SR3 with each cycle that a product is generated by the multiplier in the pipeline. In response to the safe signal 606 indicating a conflict, 0xFFFF is selected by multiplexer 624 for shifting into the shift register instead of the row index in register 618. The value 0xFFFF is a value that will not be input as the row index in a tuple.

Once the conflicting row index is shifted out of the shift register, the safe signal 606 will be asserted and logic circuit 604 will read the next tuple from the FIFO buffer 602 and store the tuple in register 618.

FIG. 10 shows a flowchart of an exemplary process for multiplying a sparse matrix by a dense vector. At block 702, a load-store control circuit reads a dense vector from off-chip memory and stores the vector across N memory banks. At block 704, the load-store control reads N triplets at time, in parallel from off-chip memory, and streams N triplets at a time to a first switch circuit. The triplets describe non-zero elements of a sparse matrix.

At block 706, the first switch circuit routes the triplets by column indices and provides the column indices as read-address inputs to the memory banks having the vector elements of the dense vector. At block 708, the referenced vector elements are read from the memory banks as addressed by the column indices, and at block 710 the vector elements and the non-zero data elements of the associated triplets are input in parallel to N multipliers. The multipliers multiply the data values by the vector elements at block 712. At block 714 the products and the row indices of the associated triplets are provided as tuples at the input ports of a second switch circuit.

At block 716, the second switch circuit routes the tuples to HRB circuits according to the row indices of the tuples. The HRB circuits detect accumulation hazards posed by accumulating products of the same rows in successive cycles and delay the accumulations if necessary at block 718. At block 720, the accumulation circuits accumulate products by row indices.

Various logic may be implemented as circuitry to carry out one or more of the operations and activities described herein and/or shown in the figures. In these contexts, a circuit or circuitry may be referred to as "logic," "module," "engine," or "block." It should be understood that logic, modules, engines and blocks are all circuits that carry out one or more of the operations/activities. In certain implementations, a programmable circuit is one or more computer circuits programmed to execute a set (or sets) of instructions stored in a ROM or RAM and/or operate according to configuration data stored in a configuration memory.

Though aspects and features may in some cases be described in individual figures, it will be appreciated that features from one figure can be combined with features of another figure even though the combination is not explicitly shown or explicitly described as a combination.

The circuits and methods are thought to be applicable to a variety of systems for multiplying sparse matrices by dense vectors. Other aspects and features will be apparent to those skilled in the art from consideration of the specification. The circuits and methods may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement for multiplying a sparse matrix by a dense vector, comprising:
    a first switching circuit having N input ports and N output ports and configured to route input triplets from the N input ports to the N output ports based on column indices of the triplets, wherein N≥2, and each triplet includes a non-zero value, a row index, and a column index;
    N first memory banks coupled to the output ports of the first switching circuit respectively, wherein each first memory bank is configured to store a subset of a plurality of vector elements and has a read-address port coupled to input the column index of the triplet from the respective output port of the first switching circuit;

N multipliers coupled to read-data ports of the N first memory banks, respectively, wherein each multiplier is configured to multiply the non-zero value of the triplet from the respective output port of the first switching circuit by the vector element from the read-data port of the respective first memory bank;

a second switching circuit having N input ports coupled to the N multipliers and configured to route tuples from the N input ports to N output ports based on row indices of the tuples, wherein each tuple includes a product output by the one of the N multipliers and a row index output by one of the N output ports of the first switching circuit;

N accumulator circuits coupled to the N output ports of the second switching circuit, respectively, wherein each accumulator circuit is configured to sum products of tuples having equal row indices; and a control circuit configured to read N triplets of the sparse matrix in parallel from one or more second memory banks and to provide the N input triplets to the N input ports of the first switching circuit, until all triplets of the sparse matrix have been read, wherein the control circuit is configured to read N subsets of the plurality of vector elements from the one or more second memory banks and write the subsets of the plurality of vector elements in the first memory banks.

2. The circuit arrangement of claim 1, further comprising N hazard-resolving circuits coupled between the N output ports of the second switching circuit and input ports of the N accumulator circuits, respectively, wherein each hazard-resolving circuit is configured to delay input of a product of a first tuple to the respective accumulator circuit, in response to the first tuple and a second tuple having equal row indices and the first tuple and the second tuple being input to the hazard-resolving circuit in successive cycles, until the respective accumulator circuit has completed accumulation of the product of the second tuple.

3. The circuit arrangement of claim 1, wherein each accumulator circuit includes a memory bank configured to store respective current totals for a subset of row indices, and the row index in each tuple input to the accumulator circuit indicates a read address from the memory bank.

4. The circuit arrangement of claim 3, further comprising N hazard-resolving circuits coupled between the N output ports of the second switching circuit and input ports of the N accumulator circuits, respectively, wherein each hazard-resolving circuit is configured to delay summing by the respective accumulator circuit until the respective accumulator circuit has added a product of a previously input tuple having the row index to a current total for the row index and updated the current total for the row index in the memory bank of the respective accumulator circuit.

5. The circuit arrangement of claim 1, wherein the first memory banks referenced by bank numbers 0 through N−1, the plurality of vector elements is M, and the control circuit is configured to store dense vector element j in bank number (j modulo N) of the first memory banks, for $0 \leq j \leq M-1$.

6. The circuit arrangement of claim 1, wherein the first switching circuit is a multi-stage switching network, and the second switching circuit is a multi-stage switching network.

7. The circuit arrangement of claim 1, wherein each accumulator circuit includes a memory bank configured to store respective current totals for a subset of row indices, and the row index in each tuple input to the accumulator circuit indicates a read address from the memory bank, and the circuit arrangement further comprising a control circuit configured to:

read N subsets of the plurality of vector elements from one or more second memory banks and write the subsets of the plurality of vector elements in the first memory banks, read N triplets of the sparse matrix in parallel from the one or more second memory banks and to provide the N input triplets to the N input ports of the first switching circuit, until all triplets of the sparse matrix have been read, read, in response to completing multiplication of the sparse matrix by the dense vector, N current totals from the memory banks of the N accumulator circuits in parallel until all current totals have been read, and write each set of N current totals to the memory banks of the N accumulator circuits.

8. A method for multiplying a sparse matrix by a dense vector, comprising:

routing by a first switching circuit having N input ports and N output ports, input triplets from the N input ports to the N output ports based on column indices of the triplets, wherein $N \geq 2$, and each triplet includes a non-zero value, a row index, and a column index;

storing a subset of a plurality of vector elements in N first memory banks coupled to the output ports of the first switching circuit, respectively, and having a read-address port coupled to input the column index of the triplet from the respective output port of the first switching circuit;

multiplying by N multipliers coupled to read-data ports of the N first memory banks, respectively, the non-zero value of the triplet from the respective output port of the first switching circuit by the vector element from the read-data port of the respective first memory bank;

routing by a second switching circuit having N input ports coupled and to the N multipliers, tuples from the N input ports to N output ports based on row indices of the tuples, wherein each tuple includes a product output by the one of the N multipliers and a row index output by one of the N output ports of the first switching circuit; and summing by N accumulator circuits coupled to the N output ports of the second switching circuit, respectively, products of tuples having equal row indices;

reading by a control circuit, N triplets of the sparse matrix in parallel from one or more second memory banks and providing the N input triplets to the N input ports of the first switching circuit, until all triplets of the sparse matrix have been reading by a control circuit, N triplets of the sparse matrix in parallel from one or more second memory banks and providing the N input triplets to the N input ports of the first switching circuit, until all triplets of the sparse matrix have been read;

reading by the control circuit, N subsets of the plurality of vector elements from the one or more second memory banks and writing the subsets of the plurality of vector elements in the first memory banks; and reading by the control circuit, N subsets of the plurality of vector elements from the one or more second memory banks and writing the subsets of the plurality of vector elements in the first memory banks.

9. The method of claim 8, further comprising delaying by N hazard-resolving circuits coupled between the N output ports of the second switching circuit and input ports of the N accumulator circuits, respectively, input of a product of a first tuple to the respective accumulator circuit, in response to the first tuple and a second tuple having equal row indices and the first tuple and the second tuple being input to the hazard-resolving circuit in successive cycles, until the respective accumulator circuit has completed accumulation of the product of the second tuple.

10. The method of claim 8, further comprising storing in a memory bank of each accumulator circuit, respective current totals for a subset of row indices, and the row index in each tuple input to the accumulator circuit indicates a read address from the memory bank.

11. The method of claim 10, further comprising delaying by N hazard-resolving circuits coupled between the N output ports of the second switching circuit and input ports of the N accumulator circuits, respectively, summing by the respective accumulator circuit until the respective accumulator circuit has added a product of a previously input tuple having the row index to a current total for the row index and updated the current total for the row index in the memory bank of the respective accumulator circuit.

12. The method of claim 11, wherein the plurality of vector elements is M and the method further comprising storing by the control circuit in the first memory banks referenced by bank numbers 0 through N−1, dense vector element j in bank number (j modulo N) of the first memory banks, for 0≤j≤M−1.

13. The method of claim 8, further comprising:

routing the input triplets through multiple stages of the first switching circuit; and routing the tuples through multiple stages of the second switching circuit.

14. The method of claim 8, wherein each accumulator circuit includes a memory bank, and the row index in each tuple input to the accumulator circuit indicates a read address from the memory bank, the method further comprising:

storing respective current totals for a subset of row indices in the memory bank of each accumulator circuit; and performing by a control circuit, operations including:

reading N subsets of the plurality of vector elements from one or more second memory banks and writing the subsets of the plurality of vector elements in the first memory banks, reading N triplets of the sparse matrix in parallel from the one or more second memory banks and to providing the N input triplets to the N input ports of the first switching circuit, until all triplets of the sparse matrix have been read, reading, in response to completing multiplication of the sparse matrix by the dense vector, N current totals from the memory banks of the N accumulator circuits in parallel until all current totals have been read, and writing each set of N current totals to the memory banks of the N accumulator circuits.

15. A circuit arrangement for multiplying a sparse matrix by a dense vector, comprising:

a first switching circuit having N input ports and N output ports and configured to route input triplets from the N input ports to the N output ports based on column indices of the triplets, wherein N≥2, and each triplet includes a non-zero value, a row index, and a column index;

N first memory banks coupled to the output ports of the first switching circuit respectively, wherein each first memory bank is configured to store a subset of a plurality of vector elements and has a read-address port coupled to input the column index of the triplet from the respective output port of the first switching circuit;

N multipliers coupled to read-data ports of the N first memory banks, respectively, wherein each multiplier is configured to multiply the non-zero value of the triplet from the respective output port of the first switching circuit by the vector element from the read-data port of the respective first memory bank;

a second switching circuit having N input ports coupled to the N multipliers and configured to route tuples from the N input ports to N output ports based on row indices of the tuples, wherein each tuple includes a product output by the one of the N multipliers and a row index output by one of the N output ports of the first switching circuit;

N accumulator circuits coupled to the N output ports of the second switching circuit, respectively, wherein each accumulator circuit is configured to sum products of tuples having equal row indices;

N hazard-resolving circuits coupled between the N output ports of the second switching circuit and input ports of the N accumulator circuits, wherein each hazard-resolving circuit is configured to delay summing by the respective accumulator circuit until the respective accumulator circuit has added a product of a previously input tuple having the row index to a current total for the row index and updated the current total for the row index in the memory bank of the respective accumulator circuit; and a plurality of FIFO buffers respectively coupled between the N output ports of the first switching circuit and write-data ports of the N first memory banks, between the read-data ports of the N first memory banks and the N input ports of the second switching circuit, between the N output ports of the second switching circuit and the N hazard-resolving circuits, and between the N hazard-resolving circuits and the input ports of the N accumulator circuits.

16. A method for multiplying a sparse matrix by a dense vector, comprising:

routing by a first switching circuit having N input ports and N output ports, input triplets from the N input ports to the N output ports based on column indices of the triplets, wherein N≥2, and each triplet includes a non-zero value, a row index, and a column index;

storing a subset of a plurality of vector elements in N first memory banks coupled to the output ports of the first switching circuit, respectively, and having a read-address port coupled to input the column index of the triplet from the respective output port of the first switching circuit;

multiplying by N multipliers coupled to read-data ports of the N first memory banks, respectively, the non-zero value of the triplet from the respective output port of the first switching circuit by the vector element from the read-data port of the respective first memory bank;

routing by a second switching circuit having N input ports coupled and to the N multipliers, tuples from the N input ports to N output ports based on row indices of the tuples, wherein each tuple includes a product output by the one of the N multipliers and a row index output by one of the N output ports of the first switching circuit; and summing by N accumulator circuits coupled to the N output ports of the second switching circuit, respectively, products of tuples having equal row indices, reading by a control circuit, N triplets of the sparse matrix in parallel from one or more second memory banks and providing the N input triplets to the N input ports of the first switching circuit, until all triplets of the sparse matrix have been reading by a control circuit, N triplets of the sparse matrix in parallel from one or more second memory banks and providing the N input triplets to the N input ports of the first switching circuit, until all triplets of the sparse matrix have been read;

delaying by N hazard-resolving circuits coupled between the N output ports of the second switching circuit and input ports of the N accumulator circuits, summing by the respective accumulator circuit until the respective accumulator circuit has added a product of a previously input tuple having the row index to a current total for the row index and updated the current total for the row index in the memory bank of the respective accumulator circuit; and buffering data by a plurality of FIFO buffers respectively coupled between the N output ports of the first switching circuit and write-data ports of the N first memory banks, between the read-data ports of the N first memory banks and the N input ports of the second switching circuit, between the N output ports of the second switching circuit and the N hazard-resolving circuits, and between the N hazard-resolving circuits and the input ports of the N accumulator circuits.

\* \* \* \* \*